(12) United States Patent
Flores

(10) Patent No.: US 11,280,393 B1
(45) Date of Patent: Mar. 22, 2022

(54) THREE-PASS TORQUE CONVERTER INCLUDING CLUTCH INTEGRATED WITH TURBINE

(71) Applicant: Schaeffler Technologies AG & Co. KG, Herzogenaurach (DE)

(72) Inventor: Angel Salvador Flores, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/031,456

(22) Filed: Sep. 24, 2020

(51) Int. Cl.
  *F16H 45/02* (2006.01)
  *F16H 41/28* (2006.01)
  *F16F 15/121* (2006.01)

(52) U.S. Cl.
  CPC ............. *F16H 45/02* (2013.01); *F16H 41/28* (2013.01); *F16F 15/121* (2013.01); *F16H 2045/021* (2013.01); *F16H 2045/0263* (2013.01); *F16H 2045/0278* (2013.01)

(58) Field of Classification Search
  CPC .... F16H 45/02; F16H 41/28; F16H 2045/021; F16H 2045/0278; F16H 2045/0263; F16F 15/121
  See application file for complete search history.

(56) References Cited

U.S. PATENT DOCUMENTS

| | | |
|---|---|---|
| 9,816,596 B1 | 11/2017 | Nelson et al. |
| 9,964,193 B2 | 5/2018 | Lindemann et al. |
| 9,995,381 B2 | 6/2018 | Adari |
| 10,145,458 B2 | 12/2018 | Norwich et al. |
| 10,753,446 B2 | 8/2020 | Norwich et al. |
| 2013/0224002 A1* | 8/2013 | Ito ........................... F16H 41/30 415/182.1 |
| 2018/0363749 A1* | 12/2018 | Cai ....................... F16F 15/123 |

* cited by examiner

*Primary Examiner* — Mark A Manley
(74) *Attorney, Agent, or Firm* — Lekeisha Suggs

(57) ABSTRACT

A torque converter comprises a front cover, an impeller including an impeller shell fixed to the front cover, and a turbine including a turbine shell axially movable to frictionally engage the impeller shell such that the turbine shell forms a piston of a lock-up clutch. A reaction plate is positioned axially between the front cover and the turbine shell. A first pressure chamber is defined axially between the reaction plate and the turbine shell, a second pressure chamber is defined axially between the turbine shell and the impeller shell, and a third pressure chamber is defined axially between the reaction plate and the front cover. An output hub includes a first bore and a second bore radially offset from each other, wherein the first bore is in fluid communication with the first pressure chamber and the second bore is in fluid communication with the third pressure chamber.

16 Claims, 2 Drawing Sheets

THREE-PASS TORQUE CONVERTER INCLUDING CLUTCH INTEGRATED WITH TURBINE

TECHNICAL FIELD

The present disclosure relates generally to torque converters and more specifically to torque converters having a clutch integrated with the turbine.

BACKGROUND

Many vehicles include a launch device between the engine and the transmission. A torque converter is a type of launch device commonly used in vehicles having an automatic transmission. A typical torque converter includes an impeller shell fixed to the crankshaft of the engine and a turbine fixed to a turbine shaft, which is the input to the transmission. To improve fuel economy, most torque converters include a bypass or lock-up clutch that mechanically couples the turbine shaft to a case of the torque converter to bypass the fluid coupling. In some torque converters, the lock-up clutch may be integrated with the turbine (also referred to as a turbine piston).

SUMMARY

In general, embodiments of the present disclosure provide a torque converter comprising a front cover, an impeller including an impeller shell fixed to the front cover, and a turbine including a turbine shell axially movable to frictionally engage the impeller shell such that the turbine shell forms a piston of a lock-up clutch. A reaction plate is positioned axially between the front cover and the turbine shell. A first pressure chamber is defined axially between the reaction plate and the turbine shell, a second pressure chamber is defined axially between the turbine shell and the impeller shell, and a third pressure chamber is defined axially between the reaction plate and the front cover. An output hub includes a first bore and a second bore radially offset from each other, wherein the first bore is in fluid communication with the first pressure chamber and the second bore is in fluid communication with the third pressure chamber.

In embodiments, the reaction plate and the turbine shell are sealed to an outer surface of the output hub. A seal plate may be fixed to the front cover at an outer end and sealed to the output hub at an inner end. The seal plate may be configured to seal the first pressure chamber from the third pressure chamber. The turbine shell further may include an axially extending ring extending from a radially outer end of the piston in an axial direction toward the front cover. The reaction plate may seal to an inner surface of the axially extending ring at an outer diameter thereof and seal to the output hub at an inner diameter thereof.

In embodiments, the torque converter may include a damper assembly positioned axially between the front cover and the reaction plate in the third pressure chamber, the damper assembly including a first cover plate, a second cover plate, and a plurality of springs supported axially therebetween, wherein the reaction plate is connected to one of the first or second cover plates. The reaction plate may be connected to the other one of the first or second cover plates and the turbine shell via a single connector. The reaction plate may be connected to a radially inner end of the turbine shell.

In embodiments, a torque converter includes a front cover, an impeller including an impeller shell fixed to the front cover, and a turbine including a turbine shell axially movable to frictionally engage the impeller shell such that the turbine shell forms a piston of a lock-up clutch. A reaction plate may be positioned axially between the front cover and the turbine shell, wherein a first pressure chamber is defined axially between the reaction plate and the turbine shell, and a second pressure chamber is defined axially between the reaction plate and the front cover. An output hub may be sealed to an inner diameter of the reaction plate. A seal plate may further be fixed to the front cover and sealed to the output hub, wherein the seal plate is configured to seal the first pressure chamber from the second pressure chamber.

In embodiments, the output hub may comprise a first bore in fluid communication with the first pressure chamber and a second bore radially offset from the first bore and in fluid communication with the second pressure chamber. The first pressure chamber may be supplied fluid through the first bore of the output hub via a first flow path and the second pressure chamber may be supplied fluid through the second bore of the output hub via a second flow path.

Embodiments provide the advantageous benefit of reduced costs and complexity of conventional three-pass torque converters by utilizing a simplified architecture. Embodiments further provide for improved clutch controllability, for example, by adding a separate apply chamber. The first flow path may be bounded in part by the seal plate and the output hub. The second flow path may be bounded in part by the output hub and a stator hub. The piston may be configured to displace in an axial direction toward the impeller shell to engage the lock-up clutch in response to the first pressure chamber being supplied fluid via the first flow path. In other embodiments, a third pressure chamber may be defined axially between the turbine shell and the impeller shell. The third pressure chamber may be configured to be supplied fluid via a third flow path bounded in part by an impeller hub and a stator hub. The piston may further be configured to displace in an axial direction toward the front cover to disengage the lock-up clutch in response to the third pressure chamber being supplied fluid via the third flow path. Moreover, fluid supplied to the third pressure chamber may be returned through the second pressure chamber and the second bore of the output hub.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure provides improved clutch controllability for torque converters having the clutch integrated with the turbine by providing three fluid passages and a seal plate disposed between the turbine and damper to form an additional chamber to supply apply pressure flow for lock-up clutch engagement. The additional chamber for apply pressure flow helps control the pressure change between the fluid chambers.

Figure 1:
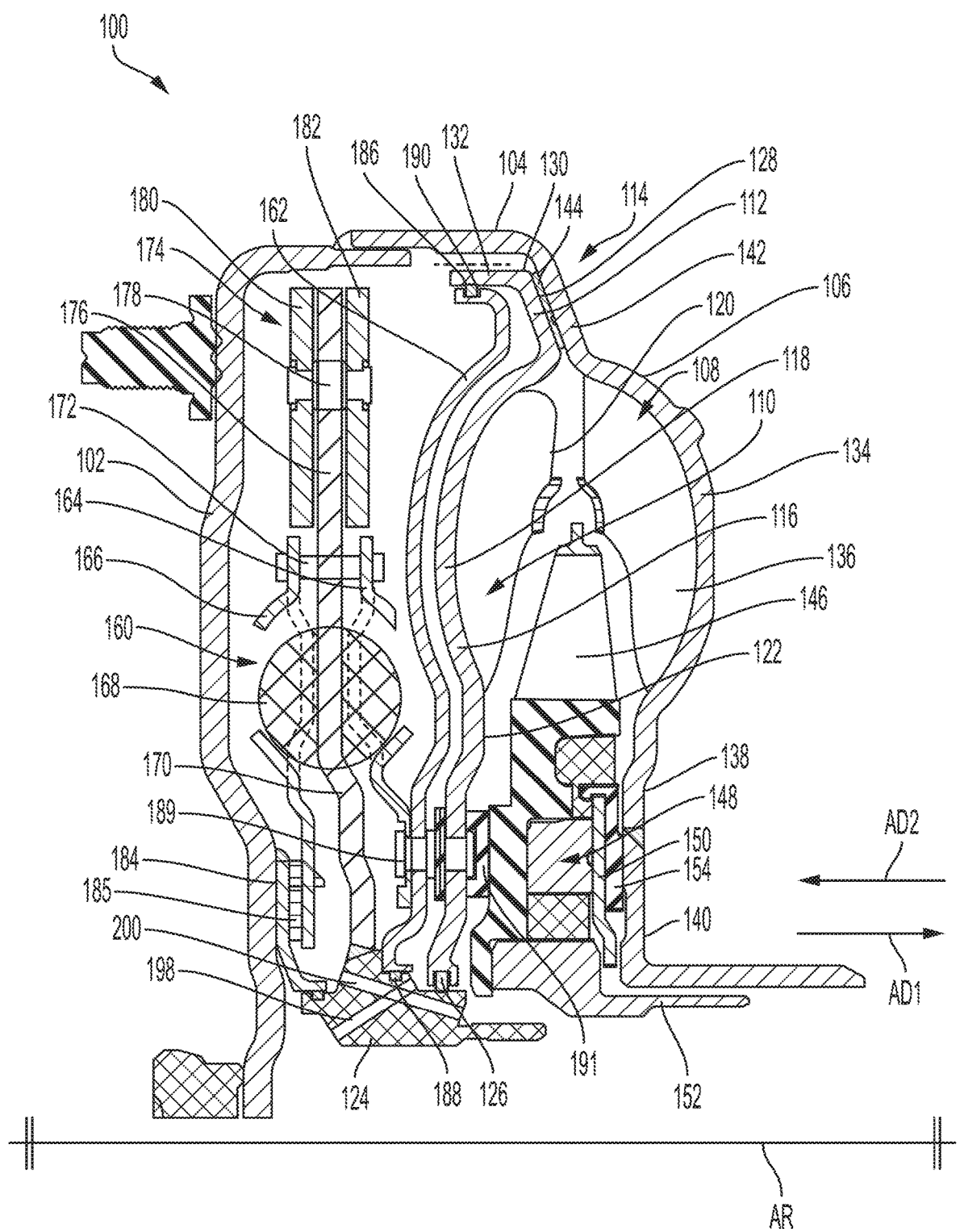
FIG. 1 is a cross-sectional view of a torque converter according to an embodiment of the present disclosure.
Figure 2:
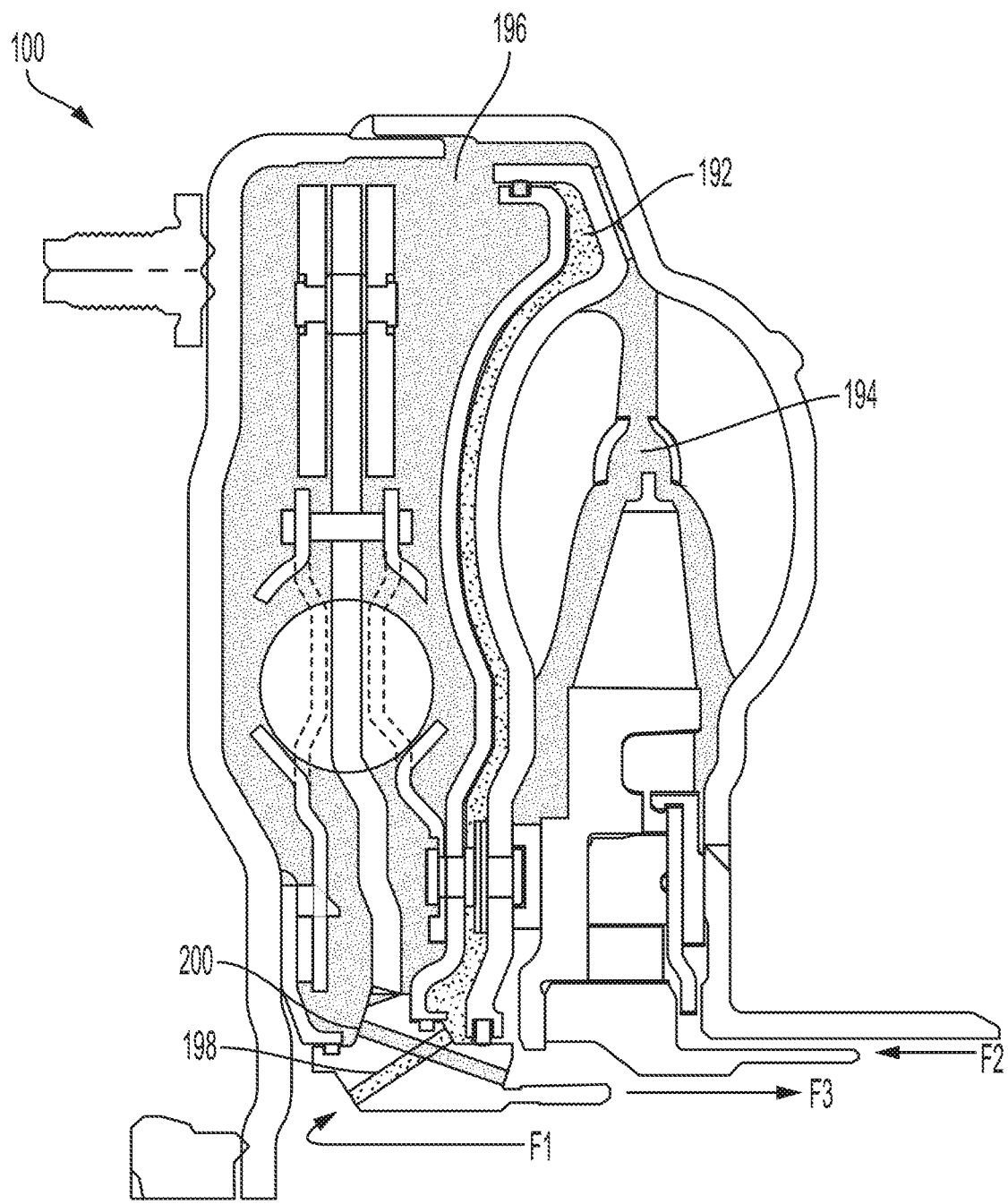
FIG. 2 shows the apply pressure flow and circulation flow areas of the torque converter of FIG. 1.

FIG. 1 shows a cross-sectional view of torque converter 100 according to an embodiment of the present disclosure. FIG. 2 shows the apply pressure flow and circulation flow areas of torque converter 100. The following description is made with reference to FIGS. 1-2.

Torque converter 100 is rotatable about a center axis AR and includes front cover 102 for connecting to a crankshaft or a flexplate of an internal combustion engine (not shown) and rear cover 104 forming impeller shell 106 of impeller or pump 108. The terms axially, radially and circumferentially as used herein are used with respect to center axis AR.

Torque converter 100 also includes turbine 110 configured to define piston 112 that is axially moveable in a first axial direction AD1 toward impeller 108 and in a second axial direction AD2 away from impeller 108 to selectively engage a portion of impeller shell 106 so as to form lockup clutch 114. Turbine 110 includes a turbine shell 116. Turbine shell 110 includes rounded blade supporting portion 118 for supporting turbine blades 120. Radially inside of blade supporting portion 118, turbine shell 116 includes an annular inner radial extension 122 that, at an inner radial end thereof, seals to output hub 124 via seal 126. Output hub 124 is arranged to connect to an input shaft for a transmission.

Piston 112 is disposed radially outside of blade supporting portion 118 and turbine blades 120. Piston 112 may include radially extending surface 128 facing impeller 108 and outermost circumferential end 130. Piston 112 and turbine shell 118 may be integrally formed. That is, piston 112 and turbine shell 118 may be formed as a single piece. Axially extending ring 132 may extend in second axial direction AD2 from outermost circumferential end 130 toward front cover 102 and away from piston 112.

Impeller shell 106 includes rounded blade supporting portion 134 for supporting impeller blades 136. Radially inside of blade supporting portion 134, impeller shell 106 includes annular inner radial extension 138 that, at an inner radial end thereof, is fixed to impeller hub 140, e.g., via welding. Outer radial extension 142 extends radially outward from blade supporting portion 134 and forms part of lock-up clutch 114. Outer radial extension 142 is configured to engage with piston 112 to transfer torque therebetween. Outer radial extension 142 may be formed integrally with rounded blade supporting portion 134. In one embodiment, friction material 144 may be bonded onto radially extending surface 128 of piston 112 for engaging outer radial extension 142. In other embodiments, friction material 144 may be bonded on outer radial extension 142.

Torque converter 100 also includes stator 146 axially between turbine 110 and impeller 108 to redirect fluid flowing from turbine blades 120 before the fluid reaches impeller 108 to increase the efficiency of torque converter 100. Stator 146 may also include a one-way clutch 148 held within the stator body by centering plate 150. Stator 146 is connected to a stator hub 152 by one-way clutch 148 for rotation in one rotational direction about center axis AR. Axial thrust washer 154, which is axially between stator 146 and impeller 108, is fixed to stator 146 at an outer circumference of centering plate 150.

Damper assembly 160 is positioned axially between front cover 102 and reaction plate 162 and is configured for transferring torque from turbine 110 to a transmission input shaft. Damper assembly 160 includes two cover plates—a turbine side cover plate 164 and a front cover side cover plate 166. Cover plates 164, 166 support springs 168 axially therebetween. Turbine side cover plate 164 is connected to reaction plate 162. Damper assembly 160 also includes a drive flange 170 positioned axially between cover plates 164, 166. Drive flange 170 is connected at an inner diameter thereof to output hub 124, e.g., via welding. Cover plates 164, 166 are connected to each other, for example, via rivets 172 at a position radially outside of springs 168. Radially outside of rivets 172, damper assembly 160 may further be provided with centrifugal pendulum absorber 174, with drive flange 170 forming a flange 176 of centrifugal pendulum absorber 174, which is held in place by spacer bolts 178 having circumferentially slidable masses 180, 182 on opposite sides thereof.

Seal plate 184 is disposed between front cover side cover plate 166 and front cover 102. That is, seal plate 184 is sandwiched between front cover 102 and thrust washer 185. Seal plate 184 is fixed to front cover 102 at an outer end (e.g., via welding) and sealed to output hub 124 at an inner diameter thereof.

Reaction plate 162 is provided axially between turbine 110 and damper assembly 160. Reaction plate 162 is provided with a radially outer seal 186 at a radially outer end thereof and is provided with a radially inner seal 188 at a radially inner end thereof. Radially outer seal 186 is provided in sealing contact with an inner circumferential surface 190 of axially extending ring 132 such that the radially outer end of reaction plate 162 is axially slidable along inner circumferential surface 190 via seal 186. Radially inner seal 188 is provided in sealing contact with output hub 124 such that the radially inner end of reaction plate 162 is axially slidable along output hub 124 via seal 188. Reaction plate 162 is further connected to turbine side cover plate 164 and annular inner radial extension 122 of turbine shell 116 via connector 189. Washer 191 may further be disposed between annular inner radial extension 122 of turbine shell 116 and stator 146.

Torque converter 100 is advantageously provided with three fluid paths F1, F2, F3 for providing fluid to three pressure chambers 192, 194, 196 to provide for improved controllability of lock-up clutch 114. First pressure chamber (also referred to as apply chamber) 192 is formed between reaction plate 162 and turbine shell 116. Second pressure chamber 194 is formed between turbine 110 and impeller 108. Third pressure chamber 196 is formed between front cover 102 and reaction plate 162, with damper assembly 160 being positioned within third pressure chamber 196. Seal plate 184 is configured to seal first pressure chamber 192 from third pressure chamber 196.

Fluid is fed to first pressure, or apply, chamber 192 via first fluid flow path F1 that travels from the transmission input shaft through bore 198 defined in output hub 124 into chamber 192. First fluid path F1 is further bounded by seal plate 184. Fluid is fed to second pressure chamber 194 through second fluid flow path F2 defined between impeller hub 140 and stator hub 152 and flows into second chamber 194. Fluid is returned from second chamber 194 through third chamber 196 via lock-up clutch 114 and exits through bore 200 defined by output hub 124 via fluid flow path F3 defined between stator hub 152 and output hub 124.

First and second pressure chambers 192, 194 may be used for clutch apply and release and third pressure chamber 196 may be used for cooling flow. That is, during lock-up mode, first pressure, or apply, chamber 192 is pressurized via first fluid path F1 to lock-up clutch 114 by forcing piston 112 against outer radial extension 142 of impeller shell 106. During lock-up mode, the third pressure chamber 196 may also be pressurized with a cooling flow via the third flow path F3, with the return cooling flow returning through the second pressure chamber 194, which cools friction material 144 of clutch 114. Having first pressure or apply chamber 192 in addition to second and third pressure chambers 194, 196 allows for more precise control of apply pressure to provide better clutch control on the clutch apply than conventional torque converters with integrated turbine pistons.

During clutch release, in which piston 112 is forced away from outer radial extension 142 of impeller shell 106, the second pressure chamber 194 is pressurized with fluid via the second flow path F2, with return flow going through the third flow path F3.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 rear cover
106 impeller shell
108 impeller
110 turbine
112 piston
114 lock-up clutch
116 turbine shell
118 blade supporting portion
120 turbine blades
122 annular inner radial extension
124 output hub
126 seal
128 surface
130 outermost circumferential end
132 axially extending ring
134 blade supporting portion
136 impeller blades
138 annular inner radial extension
140 impeller hub
142 outer radial extension
144 friction material
146 stator
148 one-way clutch
150 centering plate
152 stator hub
154 washer
160 damper assembly
162 reaction plate
164 plate
166 plate
168 springs
170 drive flange
172 rivets
174 centrifugal pendulum absorber
176 flange
178 spacer bolts
180 circumferentially slidable masses
182 circumferentially slidable masses
184 seal plate
185 washer
186 seal
188 seal
189 connector
190 inner circumferential surface
191 Washer
192 first pressure chamber
194 second pressure chamber
196 third pressure chamber
198 bore
200 bore

What is claimed is:

1. A torque converter comprising:
    a front cover;
    an impeller including an impeller shell fixed to the front cover;
    a turbine including a turbine shell axially movable to frictionally engage the impeller shell such that the turbine shell forms a piston of a lock-up clutch;
    a reaction plate positioned axially between the front cover and the turbine shell, wherein a first pressure chamber is defined axially between the reaction plate and the turbine shell, a second pressure chamber is defined axially between the turbine shell and the impeller shell, and a third pressure chamber is defined axially between the reaction plate and the front cover; and
    an output hub including a first bore and a second bore radially offset from each other, wherein the first bore is in fluid communication with the first pressure chamber and the second bore is in fluid communication with the third pressure chamber, and wherein the reaction plate and the turbine shell are sealed to an outer surface of the output hub.

2. The torque converter of claim 1, further comprising a seal plate fixed to the front cover at an outer end and sealed to the output hub at an inner end.

3. The torque converter of claim 2, wherein the seal plate is configured to seal the first pressure chamber from the third pressure chamber.

4. The torque converter of claim 2, wherein the turbine shell further includes an axially extending ring extending from a radially outer end of the piston in an axial direction toward the front cover.

5. The torque converter of claim 4, wherein the reaction plate seals to an inner surface of the axially extending ring at an outer diameter thereof and seals to the output hub at an inner diameter thereof.

6. The torque converter of claim 2, further comprising:
a damper assembly positioned axially between the front cover and the reaction plate in the third pressure chamber, the damper assembly including a first cover plate, a second cover plate, and a plurality of springs supported axially therebetween, wherein the reaction plate is connected to one of the first or second cover plates.

7. The torque converter of claim 6, wherein the reaction plate is connected to the other one of the first or second cover plates and the turbine shell via a single connector.

8. The torque converter of claim 7, wherein the reaction plate is connected to a radially inner end of the turbine shell.

9. A torque converter comprising:
a front cover;
an impeller including an impeller shell fixed to the front cover;
a turbine including a turbine shell axially movable to frictionally engage the impeller shell such that the turbine shell forms a piston of a lock-up clutch;
a reaction plate positioned axially between the front cover and the turbine shell, wherein a first pressure chamber is defined axially between the reaction plate and the turbine shell, and a second pressure chamber is defined axially between the reaction plate and the front cover;
an output hub sealed to an inner diameter of the reaction plate, wherein the reaction plate and the turbine shell are sealed to an outer surface of the output hub; and
a seal plate fixed to the front cover and sealed to the output hub, wherein the seal plate is configured to seal the first pressure chamber from the second pressure chamber.

10. The torque converter of claim 9, wherein the output hub comprises a first bore in fluid communication with the first pressure chamber and a second bore radially offset from the first bore and in fluid communication with the second pressure chamber.

11. The torque converter of claim 10, wherein the first pressure chamber is supplied fluid through the first bore of the output hub via a first flow path and the second pressure chamber is supplied fluid through the second bore of the output hub via a second flow path.

12. The torque converter of claim 11, wherein the first flow path is bounded in part by the seal plate and the output hub.

13. The torque converter of claim 11, wherein the second flow path is bounded in part by the output hub and a stator hub.

14. The torque converter of claim 11, wherein the piston is configured to displace in an axial direction toward the impeller shell to engage the lock-up clutch in response to the first pressure chamber being supplied fluid via the first flow path.

15. The torque converter of claim 11, wherein:
a third pressure chamber is defined axially between the turbine shell and the impeller shell;
the third pressure chamber is configured to be supplied fluid via a third flow path bounded in part by an impeller hub and a stator hub; and
the piston is configured to displace in an axial direction toward the front cover to disengage the lock-up clutch in response to the third pressure chamber being supplied fluid via the third flow path.

16. The torque converter of claim 15, wherein fluid supplied to the third pressure chamber is returned through the second pressure chamber and the second bore of the output hub.

* * * * *